United States Patent [19]

Oshima et al.

[11] Patent Number: 4,567,485
[45] Date of Patent: Jan. 28, 1986

[54] EARTH STATION TRANSMISSION POWER CONTROL SYSTEM FOR KEEPING AN EIRP OF DOWN LINK SIGNALS CONSTANT IRRESPECTIVE OF WEATHER

[75] Inventors: Goro Oshima; Satoru Ono; Yasuhisa Shimada, all of Tokyo, Japan

[73] Assignee: Nippon Electric Co., Ltd., Tokyo, Japan

[21] Appl. No.: 725,528

[22] Filed: Apr. 23, 1985

Related U.S. Application Data

[63] Continuation of Ser. No. 441,617, Nov. 15, 1982, abandoned.

[30] Foreign Application Priority Data

| Nov. 16, 1981 | [JP] | Japan | 56-183294 |
| Nov. 16, 1981 | [JP] | Japan | 56-183295 |
| Nov. 16, 1981 | [JP] | Japan | 56-183297 |

[51] Int. Cl.$^4$ .............................................. H04B 7/185
[52] U.S. Cl. .................................... 343/358; 343/356; 343/352
[58] Field of Search ...................... 343/17.7, 352, 353, 343/356, 358, 361, 362; 455/9, 12

[56] References Cited

U.S. PATENT DOCUMENTS

| 3,315,164 | 4/1967 | Ferguson | 455/12 X |
| 3,418,579 | 12/1968 | Hultberg | 343/353 X |
| 3,487,169 | 12/1969 | Miyagi | 455/12 X |
| 3,711,855 | 1/1973 | Schmidt et al. | 343/353 |
| 3,942,115 | 3/1976 | Wolejsza, Jr. | 343/358 X |
| 3,986,123 | 10/1976 | Tirro et al. | 343/361 X |
| 4,038,600 | 7/1977 | Thomas | 455/12 X |
| 4,119,964 | 10/1978 | Johannsen et al. | 343/17.7 |
| 4,144,495 | 3/1979 | Metzger | 343/353 X |
| 4,146,893 | 3/1979 | Inagaki et al. | 343/362 X |
| 4,150,335 | 4/1979 | Cooperman | 343/353 X |
| 4,292,685 | 9/1981 | Lee | 343/358 X |

FOREIGN PATENT DOCUMENTS

| 1087251 | 10/1980 | Canada . |
| 1462183 | 9/1969 | Fed. Rep. of Germany . |
| 2105441 | 8/1971 | Fed. Rep. of Germany . |
| 2706266 | 8/1977 | Fed. Rep. of Germany . |
| 2341986 | 9/1977 | France . |
| 52-100811 | 8/1977 | Japan . |
| 0140042 | 8/1982 | Japan | 343/352 |
| 1524946 | 9/1978 | United Kingdom . |

*Primary Examiner*—Charles T. Jordan
*Assistant Examiner*—Brian Scott Steinberger
*Attorney, Agent, or Firm*—Laff, Whitesel, Conte & Saret

[57] ABSTRACT

In an earth station (11), an amplifier (15) amplifies a pilot information signal with a variable gain. An up link pilot is thereby transmitted with a controllable transmission power. A beacon receiver (28) detects a level or C/N with which a beacon signal emitted by a satellite reaches the station. A pilot receiver (33) detects a level or C/N for a down link pilot radiated by the satellite in response to the up link pilot. A controller (37) controls the gain to keep a ratio between the levels or C/N's constant. For keeping a similar ratio constant, another station may transmit a transmission signal with a likewise controllable transmission power and receive the down link pilot together with a return signal radiated by the satellite in response to the transmission signal. Still another station may control a similarly controllable transmission power in consideration of an up link attenuation which is estimated from the level or C/N of the down link pilot. One of up link signals may be substituted for the up link pilot with that one of down link signals used for the down link pilot which is radiated by the satellite in response to that one up link signal. Up link signals transmitted with the power so controlled, are radiated by the satellite as down link signals with a substantially constant EIRP despite an attenuation which might be caused to the up link signals by rain or mist.

2 Claims, 8 Drawing Figures

EARTH STATION TRANSMISSION POWER CONTROL SYSTEM FOR KEEPING AN EIRP OF DOWN LINK SIGNALS CONSTANT IRRESPECTIVE OF WEATHER

This is a continuation of U.S. patent application Ser. No. 441,617, filed Nov. 15, 1982, now abandoned.

BACKGROUND OF THE INVENTION

This invention relates to a system for controlling transmission power in an earth or terrestrial station of a satellite communication network.

In satellite communication, rain or mist gives rise to a considerably severe attenuation particularly when higher frequencies, as in the so-called K band, are used. A suitable countermeasure is indispensable for the attenuation.

For the attenuation caused to a down link signal radiated by a satellite to an earth station, receiving installation of the earth station is adequately given a margin which is sufficient to compensate for the attenuation. It is, however, objectionable to make transmitting installation of the earth station transmit an up link signal with a high transmission power to preliminarily compensate for the attenuation which may be caused to the up link signal. This is because a transponder on board the satellite must make the satellite radiate down link signals to destination stations with an accordingly high effective isotropically radiated power (EIRP) to waste electric power on the satellite when it is clear along a path or route for the up link signal. It has therefore been proposed to control the transmission power of the up link signal in consideration of the up link rain or mist attenuation. Such a proposal is generally called control of the earth station transmission power.

In an article contributed in the Japanese language by Syun'itirô EGAMI et al to "Summaries of Papers to Be Read at 1978 General Meeting of the Institute of Electronics and Communication Engineers of Japan," pages 8-293 and 294, Paper No. S10-11 entitled 'K Band Mobile Communication System' (in translation), a proposal is described for a satellite communication network comprising a mobile station, which may be carried by a helicopter, and a fixed earth station. According to Egami et al, baseband pilot signals are exchanged between the mobile and the fixed stations through an up link channel, the satellite, and a down link channel. The pilot signals are used in measuring the signal-to-noise ratios of the mobile-to-fixed and the reverse paths. The proposal is restricted to application to only two earth stations. When one of the two earth stations is taken into consideration, a counterpart earth station is indispensable. Furthermore, a specific frequency is additionally necessary in each of the up and the down link frequency bands for use in exclusively transmitting each of the baseband pilot signals.

In another article contributed in the Japanese language by Minoru Yamamoto et al to "Summaries of Papers to Be Read at 1978 Meeting of Opto-Electromagnetic Wave Section of the Institute of Electronics and Communication Engineers of Japan," page 182, Paper No. 182 entitled 'On Compensation for Rain Attenuation in the Up Link of a BS Main Station' (in translation), two schemes are proposed. According to a first scheme, the power with which an up link signal reaches the satellite is measured on the satellite and then sent back to the main station on a telemeter signal. The satellite must therefore be equipped with specific installation for use in exclusively carrying out the control. Moreover, it is inconvenient to apply the scheme to other earth stations.

According to a second scheme of the Yamamoto et al article, the up link rain attenuation is estimated from a level reduction caused by rain in a two-way signal which is sent from the main station as an up link signal to a satellite and then sent back thereto as a down link signal from the satellite. The estimation is based on a correlation between the rain attenuation for the up link frequency band and that for the down link frequency band. The main station must therefore comprise receiving installation for the return signal sent back thereto from the satellite. Furthermore, an estimation error is inevitable because the correlation factor is liable to fluctuate.

SUMMARY OF THE INVENTION

It is therefore a general object of the present invention to provide a transmission power control system for use in an earth station of a satellite communication network, which system is capable of controlling transmission power of the up link signal of that earth station with no need for specific installation on a satellite of the network for use in exclusively carrying out the control.

It is another general object of this invention to provide a transmission power control system of the type described, which need no specific frequencies in up and down link frequency bands for use in exclusively carrying out the control.

It is still another general object of this invention to provide a transmission power control system of the type described, which is substantially free from an estimation error.

It is yet another general object of this invention to provide a transmission power control system of the type described, which is applicable to each of more than two earth stations of a satellite communication network.

Other objects of this invention will become clear as the description proceeds.

A transmission power control system according to an aspect of this invention is for use in each earth station of at least a part of a plurality of earth stations of a satellite communication network. The earth station under consideration is responsive to a first signal, which may carry information to be sent from that earth station to other earth stations, for sending an up link signal to a satellite of the network, responsive to a beacon signal emitted by the satellite and reaching that earth station with a beacon signal reception power for producing a second signal, and responsive to a return signal sent back by the satellite in response to the up link signal and reaching that earth station with a return signal reception power for producing a third signal. The transmission power control system comprises controllable amplifying means for amplifying an information signal with a variable gain to produce the first signal and thereby to make that earth station send the up link signal with a controllable transmission power dependent on the variable gain, beacon power signal producing means responsive to the second signal for producing a beacon power signal representative of the beacon signal reception power, return power signal producing means responsive to the third signal for producing a return power signal representative of the return signal reception power, and controlling means coupled to the amplifying means and responsive to the beacon and the return power signals for controlling the variable gain in consideration of a predetermined relationship between the beacon and the return signal reception powers.

A transmission power control system according to another aspect of this invention is for use in each earth station of at least a part of specific stations among a plurality of earth stations of a satellite communication network in which at least one particular station among the earth stations of the network makes a satellite of the network radiate a radiation signal with an effective isotropically radiated power kept substantially constant irrespective of a rain loss to which an up link signal is subjected while being sent from the particular station to the satellite to be radiated as the radiation signal. The specific stations are those of the earth stations of the network which are other than the above-mentioned at least one particular station. The earth station in question is responsive to a first signal for sending a transmission signal to the satellite through an up link path, responsive to the radiation signal reaching that earth station with a radiation signal reception power for producing a second signal, and responsive to a return signal sent back by the satellite in response to the transmission signal and reaching that earth station with a return signal reception power for producing a third signal. The transmission power control system comprises controllable amplifying means for amplifying an information signal with a variable gain to produce the first signal and thereby to make that earth station send the transmission signal with a controllable transmission power dependent on the variable gain, radiation power signal producing means responsive to the second signal for producing a radiation power signal representative of the radiation signal reception power, return power signal producing means responsive to the third signal for producing a return power signal representative of the return signal reception power, and controlling means coupled to the amplifying means and responsive to the radiation and the return power signals for controlling the variable gain in consideration of a predetermined relationship between the radiation and the return signal reception powers.

A transmission power control system according to still another aspect of this invention is for use in each earth station of at least a part of specific stations among a plurality of earth stations of a satellite communication network in which at least one particular station among the earth stations of the network makes a satellite of the network radiate a radiation signal with an effective isotropically radiated power kept substantially constant irrespective of a rain loss to which an up link signal is subjected while being sent from the particular station to the satellite to be radiated as the radiation signal. The specific stations are those of the earth stations of the network which are other than the afore-mentioned at least one particular station. The earth station being considered is responsive to a first signal for sending a transmission signal to the satellite through an up link path and responsive to the radiation signal reaching that earth station with a radiation signal reception power for producing a second signal. The transmission power control system comprises controllable amplifying means for amplifying an information signal with a variable gain to produce the first signal and thereby to make that earth station send the transmission signal with a controllable transmission power dependent on the variable gain, radiation power signal producing means responsive to the second signal for producing a radiation power signal representative of the radiation signal reception power, and controlling means coupled to the amplifying means and responsive to the radiation power signal for controlling the variable gain in consideration of the radiation signal reception power to substantially compensate for an up link rain attenuation to which the transmission signal is subjected when it rains at least at a part of the up link path.

With the transmission power control system according to the aspect described at first, it is unnecessary to use a specific counterpart earth station. The system according to the next-described aspect, is featured by the unnecessity of beacon signal receiving installation. The system according to the last-described aspect, is advantageously applicable to an earth station of a small scale without the necessity for beacon and return signal receiving installation.

DESCRIPTION OF THE PREFERRED EMBODIMENTS

Figure 1:
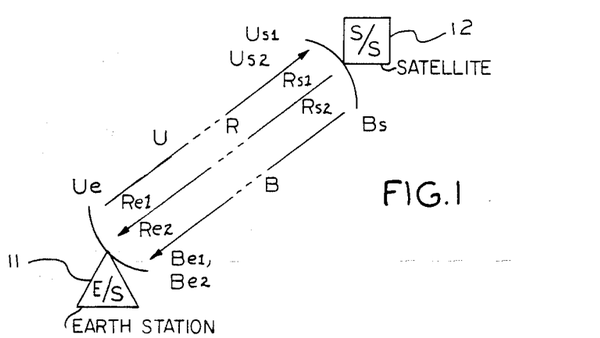
FIG. 1 is a schematic diagram for use in describing an up and a down link rain attenuation.

Referring to FIG. 1, relationships between up and down link rain attenuations will be described at first in order to facilitate an understanding of the present invention.

In FIG. 1, a particular earth or terrestrial station 11 sends an up link signal U of an up link frequency in an up link frequency band with a transmission power Ue to a satellite 12 through an up link path or route. The up link signal U is received at the satellite 12 with a first reception power Us1 in clear weather. In rainy weather in which it rains at least partly of the up link path, the up link signal U is received at the satellite 12 with a second reception power Us2. The second reception power Us2 is weaker than the first reception power Us1 as a result of an up link rain attenuation $\Delta a$.

A transponder on board the satellite 12 subjects the up link signal U to frequency conversion to a down link frequency in a down link frequency band and to amplification. The satellite 12 radiates a thereby produced down link signal. It is possible to make the satellite 12 send a return signal R back to the particular earth station 11 as a down link signal in response to the up link signal U.

In clear weather, the return signal R is radiated at the satellite 12 with a first effective isotropically radiated return power Rs1 and received at the earth station 11 with a first return signal reception power Re1. In the rainy weather, the return signal R is radiated with a second effective isotropically radiated return power Rs2 and received at the earth station 11 with a second return signal reception power Re2. The effective isotropically radiated power is often written by EIRP in the art.

A down link rain attenuation $\Delta\beta$ for the return signal R is different from the up link rain attenuation due to a frequency difference between the up and the down link frequency bands. As a result, correlation between the up and the down link rain attenuations is weak and subject to fluctuation. However, it has now been confirmed that the rain attenuation is substantially independent of frequencies in each of the up and the down link frequency bands and has a correlation factor which is approximately equal to unity.

In a known satellite communication network, the satellite 12 emits a beacon signal B with an effective isotropically radiated beacon power Bs towards earth stations of the network. The beacon signal B is received at the particular earth station 11 with a first beacon signal reception power Be1 in clear weather and with a second beacon signal reception power Be2 in the rainy weather.

The beacon signal B has a beacon signal frequency which is ordinarily adjacent to the down link frequency band. For example, the beacon signal frequency is 19.45 GHz when a down link frequency band is between 17.825 and 19.145 GHz. Such a beacon signal frequency will be called a beacon signal frequency of the down link frequency band.

It is now possible to understand that the second beacon signal reception power Be2 is related to the first beacon signal reception power Be1 by:

$$Be2 = Bs \cdot b \cdot \Delta\beta \cdot Gb = \Delta\beta \cdot Be1,$$

where b represents a transmission loss of the beacon signal B in clear weather and Gb, an antenna gain of the particular earth station 11 for the beacon signal B. The first and the second return signal reception powers Re1 and Re2 are related to each other by:

$$Re2 = Rs2 \cdot r \cdot \Delta\beta \cdot Gr = \Delta\alpha \cdot Rs1 \cdot r \cdot \Delta\beta \cdot Gr = \Delta\alpha \cdot \Delta\beta \cdot Re1,$$

where r represents a transmission loss of the return signal R in clear weather and Gr, an antenna gain of the earth station 11 for the return signal R. A ratio of the return signal reception power to the beacon signal reception power in the rainy weather (Re2/Be2) is astonishingly related to another ratio in clear weather (Re1/Be1) according to $$Re2/Be2 = \Delta\alpha \cdot (Re1/Be1). \qquad (1)$$

Figure 2:
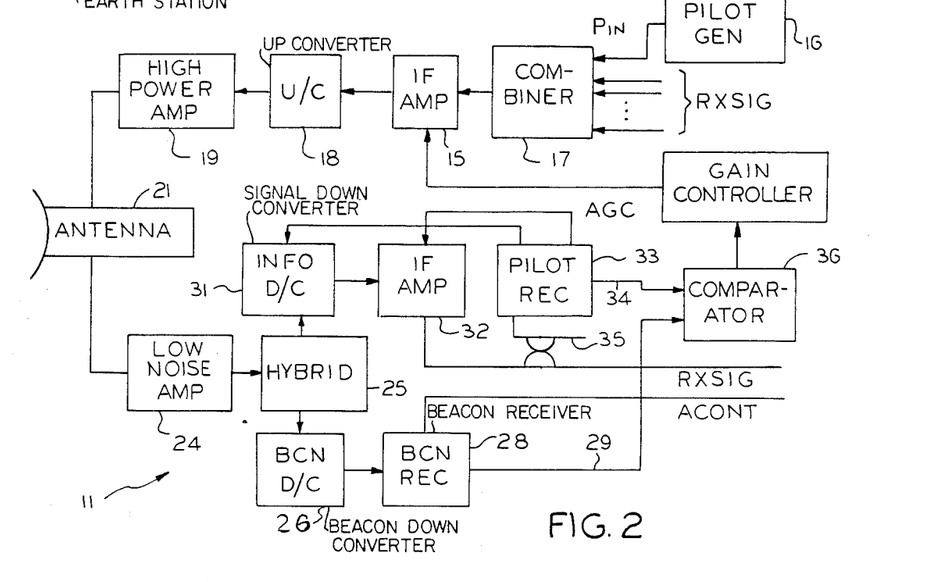
FIG. 2 is a block diagram of an earth station comprising a transmission power control system according to a first embodiment of the instant invention.

Turning now to FIG. 2, a particular earth station 11 of a satellite communication network comprises a transmission power control system according to a first embodiment of this invention. Merely for convenience of description, it will be assumed that the satellite communication network is operable in compliance with a single channel per carrier (SCPC) scheme and that the network comprises a geostatic satellite which is described merely as a satellite 12 in connection with FIG. 1.

The transmission power control system comprises a variable gain intermediate frequency amplifier 15 for amplifying a combination of a pilot information signal PIN and a plurality of transmission information signals TXSIG with a variable gain which is controllable as will later be described. The pilot information signal PIN is generated by a pilot generator 16 to provide a reference frequency for the single channel per carrier scheme. A combiner 17 is for producing the combination by combining the pilot information signal PIN and the transmission information signals TXSIG. It is presumed here that the transmission information signals TXSIG have intermediate frequencies which correspond to th respective channel frequencies of the single channel per carrier scheme.

The intermediate frequency amplifier 15 produces a transmission intermediate frequency signal, which is given to an up converter 18 and thereby converted to an up link frequency signal in an up link frequency band. A high power amplifier 19 is for amplifying the up link frequency signal to produce an antenna feed signal. The antenna feed signal comprises a first signal which results from the pilot information signal PIN.

Responsive to the antenna feed signal, an antenna 21 sends an up link signal towards the satellite through an up link path or route. The antenna 21 is for use in common in transmission and reception. The up link signal comprises, even in the absence of all transmission information signals TXSIG, an up link pilot signal which results from the first signal and has a pilot signal frequency in the up link frequency band. The up link pilot signal is radiated with a controllable transmission power which will presently be discussed. In the presence of at least one transmission information signal TXSIG, the up link signal comprises the up link pilot signal together with an up link communication signal which results from the at least one transmission information signal TXSIG.

The up link pilot signal is radiated by the satellite as a down link pilot signal in a down link frequency band. The down link pilot signal is sent back to the particular earth station 11 as a return pilot signal through a down link path which is substantially identical with the up link path in the satellite communication network under consideration. The return pilot signal is received by the antenna 21 with a return signal reception power and delivered to receiving circuitry as a received pilot signal. The receiving circuitry will shortly be described.

Down link communication signals directed to the particular earth station 11, if any, are received also by the antenna 21 and sent to the receiving circuitry as received communication signals. The received pilot signal and the received communication signals will be referred to collectively as a down link frequency signal.

As described with reference to FIG. 1, the satellite emits a beacon signal having a beacon signal frequency of the down link frequency band with a constant effective isotropically radiated beacon power. The beacon signal reaches the antenna 21 through the down link path with a beacon signal reception power. Responsive to the beacon signal, the antenna 21 supplies a received beacon signal to the receiving circuitry. Inasmuch as the beacon signal frequency is of the down link frequency band, the received beacon signal will be included in the down link frequency signal.

The transmission power is dependent, among others, on the variable gain and is accordingly controllable. The return signal reception power depends on the transmission power and also on an up and a down link rain attenuation if it rains at least partly of the substantially common up and down link path. The beacon signal reception power is subject to the down link rain attenuation. The beacon signal reception power is, however, independent of the up link rain attenuation.

The receiving circuitry comprises a wide-band low-noise amplifier 24 for amplifying the down link frequency signal to produce an amplified down link frequency signal. A hybrid circuit 25 is for separating the amplified down link frequency signal into two parts to produce a branched beacon signal and a branched down link frequency signal.

The branched beacon signal is supplied to a beacon down converter 26 for converting the beacon signal frequency to a lower frequency to produce a second signal. Supplied with the second signal, a beacon receiver 28 produces an antenna control signal ACONT known in the art. As a part of the transmission power control system, the beacon receiver 28 serves as a beacon power signal producing circuit responsive to the second signal for producing a beacon power signal 29 representative of the beacon signal reception power.

The branched down link frequency signal is delivered to an information signal down converter 31 comprising a local oscillator (not shown) for generating a local oscillation signal of a controllable frequency. The down converter 31 produces a reception intermediate frequency signal, responsive to which an automatic gain controlled intermediate frequency amplifier 32 produces an amplified intermediate frequency signal. The amplified intermediate frequency signal comprises a third signal which results from the received pilot signal. In the presence of at least one down link communication signal, the amplified intermediate frequency signal further comprises at least one reception information signal RXSIG.

Supplied with the third signal, a pilot receiver 33 delivers a frequency control signal AFC to the local oscillator of the information signal down converter 31 and a gain control signal AGC to the intermediate frequency amplifier 32. As another part of the transmission power control system, the pilot receiver 33 serves as a return power signal producing circuit responsive to the third signal for producing a return power signal 39 representative of the return signal reception power. For this purpose, the pilot receiver 33 is coupled to the amplified intermediate frequency signal through a directional coupler 35, which may be a filter for separating the third signal from the reception information signal or signals RXSIG.

The transmission power control system further comprises a controlling circuit coupled to the variable gain intermediate frequency amplifier 15 and responsive to the beacon and the return power signals 29 and 34 for controlling the variable gain in consideration of a predetermined relationship between the beacon and the return signal reception powers. More particularly, the controlling circuit comprises a comparator 36 responsive to the beacon and the return power signals 29 and 34 for producing a comparator output signal representative of a ratio of the return signal reception power to the beacon signal reception power. The ratio is designated by (Re1/Be1) or (Re2/Be2) in conjunction with FIG. 1 and is completely equivalent to an inverse ratio, such as (Be1/Re1). A transmission gain or power controller 37 is coupled to the variable gain intermediate frequency amplifier 15 and is responsive to the comparator output signal for supplying a gain control signal 39 to the intermediate frequency amplifier 15. The gain control signal 39 controls the variable gain so as to maintain the ratio always constant irrespective of weather.

Referring to Equation (1), it should be noted that the effective isotropically radiated beacon power Bs is independent of weather. The return signal R, which may be the return pilot signal, is therefore radiated from the satellite with an effective isotropically radiated return power kept always constant at the satellite irrespective of weather. Down link communication signals are radiated from the satellite to other earth stations in response to the up link communication signal also with an effective isotropically radiated down link power kept constant at the satellite.

Figure 3:
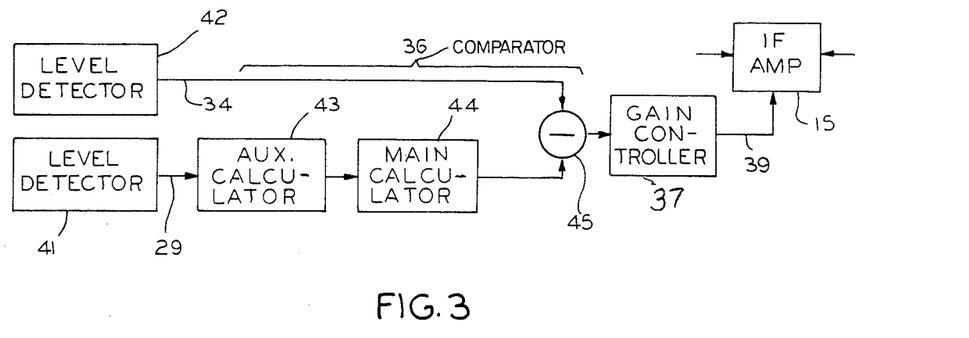
FIG. 3 shows in blocks a comparator and related circuitry for use in the system depicted in FIG. 2.

Turning to FIG. 3, the beacon receiver 28 may comprise a first level detector 41 responsive to the second signal for producing a first level signal as the beacon power signal 29. The first level signal has a beacon reception level which the second signal has and is representative of the beacon signal reception power. The pilot receiver 33 may comprise a second level detector 42 responsive to the third signal for producing a second level signal as the return power signal 34. The second level signal has a return reception level which the third signal has and is indicative of the return signal reception power.

It is to be noted here that a slight difference is caused by a frequency difference between the beacon signal frequency and the down link frequency band to the down link rain attenuations of the beacon and the return signal reception powers. The comparator comprises an auxiliary calculator 43 responsive to the first level signal for producing a corrected signal having a corrected level in which the slight difference is compensated for.

Let it be surmised that a first part between the antenna 21 (FIG. 2) and the first signal detector 41 linearly amplifies a decibel signal and that a second part between the antenna 21 and the second level detector 42 likewise linearly amplifies the decibel signal. Under the circumstances, the comparator 36 comprises a main calculator 44 responsive to the corrected signal for producing a comparison signal representative of a comparison level which is equal to the return reception level in clear weather.

Responsive to the comparison signal and the second level signal, a subtractor 45 calculates a level difference between the comparison level and the return reception level to produce a difference signal which represents the level difference and is equivalent to the above-mentioned comparator output signal. The auxiliary and the main calculators 43 and 44 may be amplifiers.

Supplied with the difference signal, the transmission gain controller 37 produces the gain control signal 39 which controls the variable gain to keep the level difference always equal to zero irrespective of weather. It is now understood that the auxiliary calculator 43 may be supplied with the second level signal rather than with the first level signal.

The relationship between the beacon and the return signal reception powers may be given by a ratio of a return carrier-to-noise power ratio (C/N)r for the third signal to a beacon carrier-to-noise power ratio (C/N)b for the second signal or by the inverse ratio. In other words, the beacon power signal 29 may be indicative of the beacon carrier-to-noise power ratio as the beacon signal reception power. The return power signal 34 may be indicative of the return carrier-to-noise power level as the return signal reception power.

In an earth station, such as the particular earth station 11, the noise resulting from the antenna 21 and the wide-band low-noise amplifier 24 is dominant in the second and the third signals. The antenna 21 and the low-noise amplifier 24 have a substantially identical noise temperature both for the beacon and the return signals.

The rain in a link path raises an equivalent noise temperature of the link path. In the down link path, the temperature rise is substantially identical for the beacon and the return signals. As regards the up link rain attenuation, the temperature rise thereby caused to the noise in the up link pilot signal and/or the up link communication signal is negligible because the receiver on board the satellite has a considerably high noise temperature. The up link rain attenuation therefore has only a small contribution to the return carrier-to-noise power ratio. The variable gain may be controlled to keep the ratio in the carrier-to-noise power ratios $(C/N)r/(C/N)b$ or $(C/N)b/(C/N)r$ always constant irrespective of weather.

It is to be noted under the circumstances that the return signal is not radiated from the satellite with an effective isotropically radiated return power kept constant at the satellite irrespective of weather. It is, however, possible to substantially suppress the variation caused in the effective isotropically radiated return power by the up link rain attenuation. In other words, the effective isotropically radiated return power is maintained at the satellite substantially constant irrespective of weather.

Use of the ratio in the carrier-to-noise power ratios is advantageous in that no limitation is imposed on gains of the first and the second parts and on the automatic gain control characteristics of the gain controlled intermediate frequency amplifier 32. More specifically, it is possible to give a considerably relaxed stability as regards the gain to those two branches of the receiving circuitry which follows the hybrid circuit 25. It is possible to remove the restrictions on the automatic gain control characteristics. The comparator 36 becomes simple.

Referring again to FIG. 3, the first and the second level detectors 41 and 42 should be changed to first and second power ratio detectors when the ratio in the carrier-to-noise power ratios is used. Responsive to the second signal, the first power ratio detector 41 produces a first power ratio signal as the beacon power signal 29. The first power ratio signal represents the beacon carrier-to-noise power ratio as the beacon signal reception power. Supplied with the third signal, the second power ratio detector 42 produces a second power ratio signal as the return power signal 34. The second power ratio signal represents the return carrier-to-noise power ratio as the return signal reception power.

Supplied with the first power ratio signal 29, the auxiliary calculator 43 produces a corrected signal which is now representative of a corrected power ratio. A slight difference which results from the frequency difference between the beacon signal frequency and the down link frequency band in the beacon carrier-to-noise power ratio relative to the return carrier-to-noise power ratio, is taken into consideration in the corrected power ratio. The comparison signal is representative of a comparison power ratio which is equal to the return carrier-to-noise power ratio in clear weather. The difference signal represents a power ratio difference between the comparison power ratio and the return carrier-to-noise power ratio. The gain control signal 39 controls the variable gain to make the difference signal always represent a zero power ratio difference.

Figure 4:
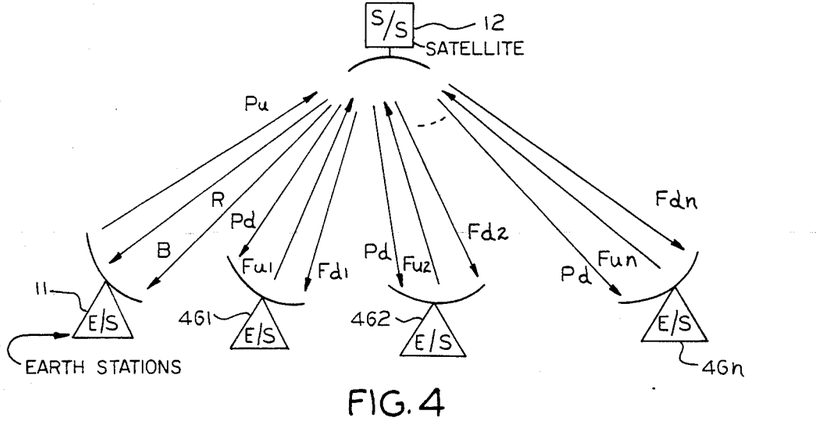
FIG. 4 is a schematic diagram for use in describing a satellite communication network.

Referring to FIG. 4, a satellite communication network comprises a particular earth station 11, a satellite 12, and first through n-th specific earth stations 461, 462, . . . , and 46n. There are (n+1) earth stations in total. It will again be assumed that the satellite communication network is operable by the use of a transponder on board the satellite 12 and in accordance with a single channel per carrier scheme in which the preassign technique is resorted to.

As described with reference to FIGS. 1 and 2, the particular earth station 11 sends an up link pilot signal towards the satellite 12. The up link pilot signal will now be designated by Pu. The up link pilot signal Pu is subjected to frequency conversion and to amplification by the transponder and radiated by the satellite 12 as the return pilot signal R to the particular earth station 11 and as down link pilot signals Pd to the specific earth stations 461 through 46n.

By the use of the beacon signal B and the return pilot signal R, the particular earth station 11 makes the satellite 12 emit the return and the down link pilot signals R and Pd with the effective isotropically radiated pilot power kept substantially constant irrespective of the weather along the up link path for the particular earth station 11. In other words, the effective isotropically radiated pilot power is maintained substantially constant even in rainy weather in which the up link pilot signal Pu is subjected to an up link rain attenuation, which will now be named a rain loss merely for convenience of nomenclature.

The first through the n-th specific earth stations 461 to 46n send first through n-th up link communication signals to the satellite 12, respectively, through channels assigned in the up link frequency band to the respective earth stations 461 through 46n according to the single channel per carrier scheme. As will soon become clear, first through n-th transmission signals Fu1, Fu2, . . . , and Fun are comprised by the first through the n-th up link communication signals, respectively.

At the satellite 12, the first through the n-th transmission signals Fu1 to Fun are subjected to frequency conversion and to amplification and then radiated as first through n-th return signals Fd1, Fd2, . . . , and Fdn in first through n-th down link communication signals, respectively. The first through the n-th down link communication signals are sent from the satellite 12 to the first through the n-th specific earth stations 461 to 46n, respectively, through channels allotted in the down link frequency band to the respective earth stations 461 through 46n in compliance with the single channel per carrier scheme.

Each of the specific earth stations 461 through 46n will be called an i-th earth station 46i (i being representative of one of 1 through n). It is now possible as will presently be described to make the i-th earth station 46i deal with the down link pilot signal Pd and the i-th return signal Fdi to control the transmission power of the i-th transmission signal Fui so as to substantially compensate for an up link rain attenuation caused to the transmission signal Fui when it rains at least partly of an i-th up link path for the i-th earth station 46i. The down link pilot signal Pd directed to the i-th earth station 46i will be called a radiation signal.

Figure 5:
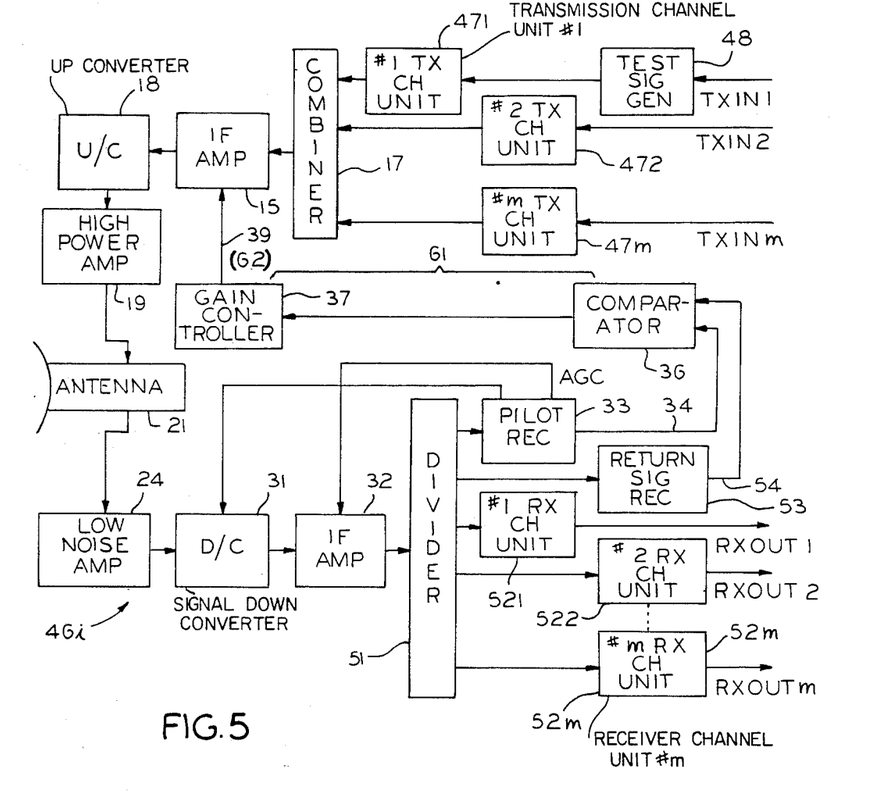
FIG. 5 is a block diagram of an earth station comprising a transmission power control system according to a second embodiment of this invention.

Turning now to FIG. 5, the i-th earth station 46i comprises a transmission power control system according to a second embodiment of this invention. Parts corresponding to those illustrated in the foregoing with reference to FIG. 2, are designated by like reference numerals.

The transmission power control system being illustrated, comprises a variable gain intermediate frequency amplifier 15 for amplifying a combination of signals with a variable gain which is controllable as will later become clear. The combination is produced by a combiner 17. For this purpose, first through m-th transmission channel units 471, 472, ..., and 47m are for modulating first through m-th channel transmission information signals TXIN1, TXIN2, ..., and TXINm, respectively. First through m-th intermediate frequency information signals produced by the first through the m-th transmission channel units 471 to 47m for delivery to the combiner 17, are of intermediate frequencies which correspond to the respective channel frequencies of the single channel per carrier scheme for those earth stations of the satellite communication network which include the specific earth stations 461 through 46n.

As described in conjunction with FIG. 2, an antenna feed signal is fed to an antenna 21 and radiated towards the satellite as the i-th up link communication signal. Let the i-th transmission signal Fui result from the first intermediate frequency information signal and be radiated by the antenna 21 with a controllable transmission power. Even in the absence of the first channel transmission information signal TXIN1, a test signal generator 48 controls the first transmission channel unit 471 so as to make the antenna 21 radiate the i-th transmission signal Fui with the controllable transmission power.

The antenna 21 receives the i-th down link signal which may comprise the radiation signal Pd, the i-th return signal Fdi, and at least one down link communication signal directed to the i-th earth station 46i from the satellite in response to up link communication signals transmitted thereto from other earth stations. Responsive to the radiation signal Pd received with a radiation signal reception power, the antenna 21 eventually makes the amplified intermediate frequency signal include a second signal. Supplied with the return signal Fdi with a return signal reception power, the antenna 21 likewise makes the amplified intermediate frequency signal include a third signal. The antenna 21 makes the amplified intermediate frequency signal similarly include communication signal components resulting from the down link communication signals.

In the illustrated transmission power control system, the amplified intermediate frequency signal is supplied to a divider 51 for distributing the second signal to the pilot signal receiver 33, which will now be called a radiation signal receiver. Furthermore, the return power signal 34 will be named a radiation power signal, which is representative of the radiation signal reception power. The divider 51 distributes the communication signal components to first through m-th reception channel units 521, 522, ..., and 52m. The first through the m-th reception channel units 521 to 52m are for carrying out reception and demodulation to produce first through m-th channel reception information signals RXOUT1, RXOUT2, ..., and RXOUTm, respectively. Moreover, the divider 51 distributes the third signal to a return signal receiver 53 for producing a return power signal 54 representative of the return signal reception power. Although similar to each of the reception channel units 521 through 52m, the return signal receiver 53 need not carry out demodulation but should deliver the automatic frequency control signal AFC and the automatic gain control signal AGC to the information signal down converter 31 and the automatic gain controlled intermediate frequency amplifier 32, respectively.

Supplied with the radiation power signal 34 and the return power signal 54, the comparator 36 produces the comparator output signal. The transmission gain controller 37 delivers the gain control signal 39 to the variable gain intermediate frequency amplifier 15. The gain control signal 39 controls the variable gain so as to maintain a ratio between the return and the radiation signal reception powers always constant irrespective of the weather along the i-th up link path for the i-th earth station 46i.

Comparison between the transmission power control systems illustrated with reference to FIGS. 2 and 5, will show that the radiation signal Pdi is used in the system of FIG. 5 instead of the beacon signal B which is emitted by the satellite with a constant effective isotropically radiated beacon power at the satellite. As described heretobefore, the radiation signal is radiated from the satellite with the effective isotropically radiated radiation power controlled at the particular earth station 11 so as to be substantially constant irrespective of the weather along the up link path for the particular earth station 11. The return signal resulting from the first channel transmission information signal TXIN1 is substituted for the return pilot signal R. The radiation signal receiver 33 and the return signal receiver 53 are in exact correspondence to the beacon signal receiver 28 and the pilot signal receiver 33, respectively.

As described hereinabove with reference to Equation (1) in conjunction with the transmission power control system illustrated with reference to FIG. 2, the return signal is radiated from the satellite with the effective isotropically radiated return power kept constant at the satellite irrespective of the weather along the i-th up link path for the i-th earth station 46i. Down link communication signal or signals are radiated from the satellite in response to the i-th up link communication signal with the effective isotropically radiated down link power kept constant at the satellite.

The comparator 36 and the related circuitry for use in the transmission power control system illustrated with reference to FIG. 5 may be that described with reference to FIG. 3 for the signal levels. Alternatively, it is possible to use the circuitry described in connection with FIG. 3 for the carrier-to-noise power ratios. In the latter event, the return signal and the down link communication signal or signals are controlled so as to be radiated at the satellite with the respective effective isotropically radiated powers kept substantially constant irrespective of the weather along the i-th up link path.

Figure 6:
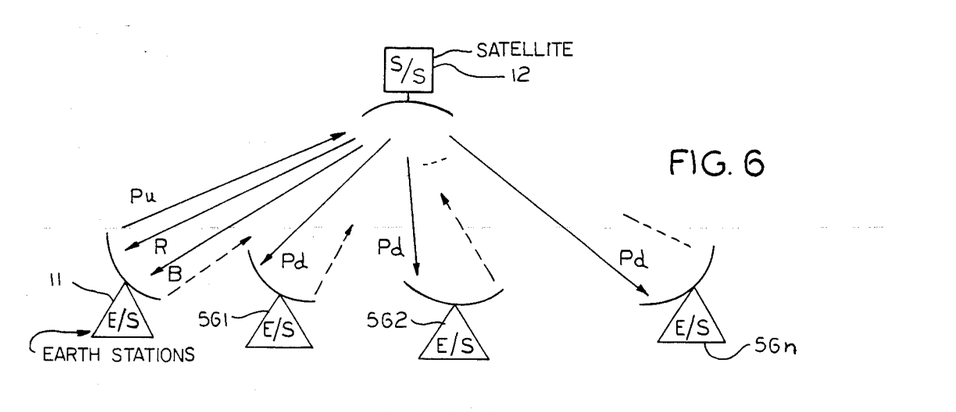
FIG. 6 is a schematic diagram for use in describing another satellite communication network.

Turning to FIG. 6, a satellite communication network comprises a particular earth station 11, a satellite 12, and first through n-th specific earth stations 561, 562, ..., and 56n. It is assumed that the satellite communication network is operable once again according to a single channel per carrier scheme by the use of a transponder on board the satellite 12.

The particular earth station 11 is operable as described with reference to FIGS. 1 and 2 and to FIG. 4. The specific earth stations 561 through 56n receive the down link pilot signals Pd, respectively. Each of the particular and the specific earth stations 11 and 561 through 56n may transmit an up link signal to the satellite 12 as depicted by a dashed line having an arrowhead. Each earth station may receive a down link signal.

As in FIG. 4, each of the specific earth stations 561 through 56n will be called an i-th earth station 56i. The up link signal transmitted from the i-th earth station 56i will be named a transmission signal. As in FIG. 5, the transmission signal is transmitted towards the satellite 12 with a controllable transmission power. It is possible to make the i-th earth station 56i control the transmission power so that at least one down link signal be radiated from the satellite 12 in response to the i-th up link signal with an effective isotropically radiated down link power kept substantially constant at the satellite 12 irrespective of an up link rain attenuation for the transmission signal.

Figure 7:
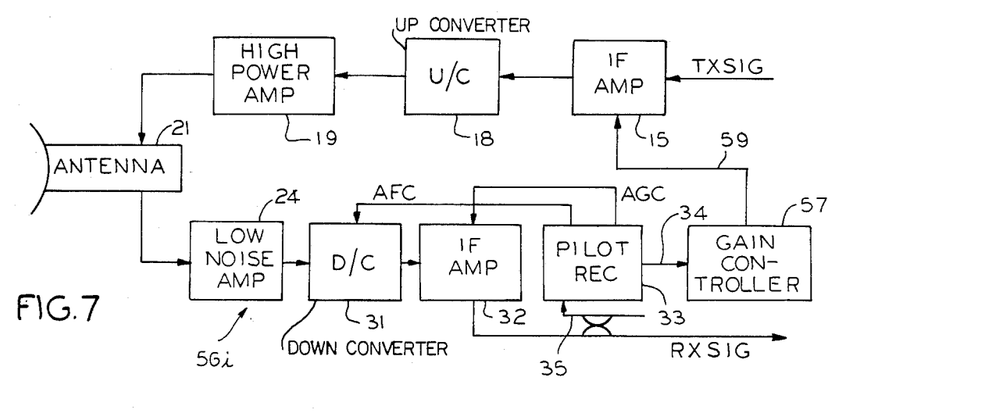
FIG. 7 is a block diagram of an earth station comprising a transmission power control system according to a third embodiment of this invention.

Referring to FIG. 7, the i-th earth station 56i comprises a transmission power control system according to a third embodiment of this invention. Similar parts are designated again by like reference numerals.

In the transmission power control system being illustrated, a variable gain intermediate frequency amplifier 15 is for amplifying a transmission information signal TXSIG with a variable gain which is controllable as will later become clear. The transmission information signal TXSIG has an intermediate frequency and may comprise a plurality of like transmission information signals. A first signal of the type described before, is derived from the transmission information signal TXSIG and is radiated from the antenna 21 as the transmission signal.

As in FIG. 5, the radiation signal Pdi is received by the antenna 21 with a radiation signal reception power. The amplified intermediate frequency signal comprises a second signal resulting eventually from the radiation signal Pdi. The amplified intermediate frequency signal may additionally comprise at least one reception information signal RXSIG. A pilot receiver 33 is for producing, among others, a radiation power signal 34 representative of the radiation signal reception power and is supplied with the second signal from the amplified intermediate frequency signal through a directional coupler 35.

The illustrated transmission power control system comprises a transmission gain controller 57 responsive to the radiation power signal 34 for delivering a gain control signal 59 to the variable gain intermediate frequency amplifier 15. The gain control signal 59 is for controlling the variable gain in consideration of the radiation signal reception power so as to substantially compensate for an up link rain attenuation to which the transmission signal is subjected in rainy weather in which it rains at least partly of an i-th up link path for the i-th earth station 56i.

It is to be noted that the radiation signal is radiated by the satellite with a substantially constant effective isotropically radiated radiation power at the satellite in response to an up link pilot signal Pu sent from the particular earth station 11 to the satellite. The radiation signal reception power is reduced in the rainy weather due to a down link rain attenuation along an i-th down link path for the i-th earth station 56i. As described in conjunction with FIG. 1, the up link rain attenuation along the i-th up link path is related to the down link rain attenuation along the i-th down link path by a correlationship. It is therefore feasible to suppress the variation caused in the effective isotropically radiated down link power by the up link rain attenuation and thereby to substantially compensate for the up link rain attenuation by making the gain control signal 59 control the variable gain in consideration of the reduction of the radiation signal reception power.

Referring back to FIG. 5, the i-th earth station 46i may comprise a transmission power control system according to a modification of that already described hereinabove. In a first mode of operation, the modified system is operable as already described with the return signal receiver 53 used as a standby reception channel unit. In a second mode of operation, the modified system is operable as that illustrated with reference to FIG. 7 with the return signal receiver 53 used as one of the first through the m-th reception channel units 521 to 52m. It is necessary for this purpose that the return signal receiver 53 be capable of additionally carrying out demodulation. In the first mode of operation, a circuit combination 61 of the comparator 36 and the transmission gain controller 37 should be operable as described in conjunction with FIG. 5. In the second mode of operation, the circuit combination 61 should be operable like the single transmission gain controller 37. In either of the first and the second modes of operation, the circuit combination 61 supplies a gain control signal 62 to the variable gain intermediate frequency amplifier 15.

Figure 8:
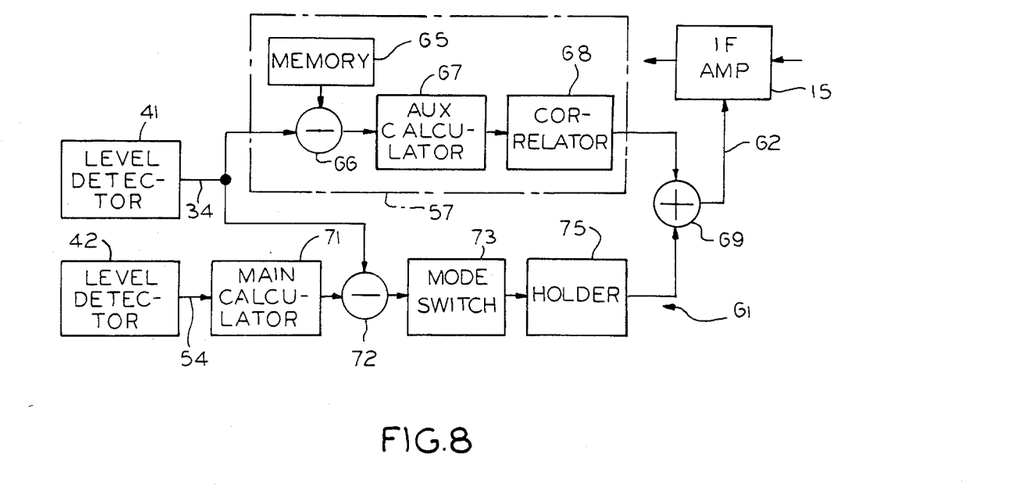
FIG. 8 shows in blocks a comparator and associated circuitry for use in a modification of the system illustrated in FIG. 5.

Referring to FIG. 8, the radiation signal receiver 33 comprises a first level detector 41 and the return signal receiver 53, a second level detector 42. The first and the second level detectors 41 and 42 are of the type described in connection with FIG. 3. Responsive to the second signal, the first level detector 41 produces a first level signal as the radiation power signal 34. The first level signal 34 represents a first power level which corresponds to the radiation signal reception power. Supplied with the third signal, the second level detector 42 produces a second level signal as the return power signal 54. The second level signal 54 represents a second power level which corresponds to the return signal reception power.

In compliance with the mode of operation in which the modified system is put, the circuit combination 61 is operable in either of the first and the second modes of operation as will presently be described. Unless the modes of operation are specified, operation of the circuit combination 61 is common to both modes of operation.

An initial level memory 65 is responsive to the first level signal 34 for memorizing an initial level of the first power level. The initial level is a maximum of the first power level and is a level which the first level signal 34 represents in a clear or initial state wherein it is clear along the i-th down link path for the i-th earth station 46i. Irrespective of the weather along the i-th down link path, the initial level memory 65 produces an initial level signal representative of the initial level.

A first subtractor 66 calculates a first level difference between the first power level and the initial level. The first level difference indicates a reduction which, if any, is caused to the first power level in a rainy state in which it rains at least partly along the i-th down link path. The first subtractor 66 produces a first difference signal representative of the first level difference.

In the rainy state, the carrier reception power decreases among the radiation signal reception power due to the rain attenuation for the i-th down link path. Furthermore, it is ordinary that the noise power rises among the radiation signal reception power as a result of an increase in a celestial or sky noise. It has now been confirmed that the increase has a correlationship relative to the decrease in the carrier reception power. The correlationship is dependent on the decrease in the carrier reception power. An auxiliary calculator 67 is for eliminating a contribution of the increased celestial noise to the first level difference. The auxiliary calculator 67 produces a corrected signal having a corrected level which is equal to the reduction caused to the carrier reception power in the rainy state. In other words, the corrected level is a level into which the first level difference is corrected in consideration of a celestial noise.

The reduction in the carrier reception power has a correlationship relative to a reduction caused to the power of the carrier for the up link signal, such as the transmission signal Fui, in rainy weather in which it rains at least partly of the i-th up link path for the i-th earth station 46i. The correlationship is now dependent on the frequency difference between the up and the down link frequency bands and is empilically presumable. As will shortly be understood, it rains at least partly of the i-th down link path in the rainy weather even if the satellite is not geostationary.

A correlator 68 is for estimating, from the corrected level, an estimated level difference which is estimated as an up link rain attenuation for the i-th up link path by resorting to the presumed correlationship between the corrected level and the up link rain attenuation. The correlator 68 produces an estimated or correlated signal representative of the estimated level difference, which is substantially equal to zero in the clear state in which it will be clear along the i-th up link path. The estimated signal is supplied to an adder 69.

In the circuit combination 61, a main calculator 71 is similar to the main calculator 44 described in conjunction with FIG. 3. Supplied with the second level signal 34, the main calculator 71 produces a comparison signal representative of a comparison level which becomes equal to the first power level in the clear weather.

A second subtractor 72 is responsive to the first level signal 34 and the comparison signal for producing a second difference signal representative of a second level difference between the first power level and the comparison level. The second level difference is equal to zero in the clear weather.

A mode switch 73 is preferably automatically put in an on and an off state when the modified system is in the first and the second modes of operation, respectively. When put in the on state, the mode switch 73 supplies the second difference signal to a compensation level holder 75, which allows passage therethrough of the second difference signal while holding the second level difference as a minimum difference only in the clear weather. The minimum difference is so named because the second level difference has a minimum absolute value in the clear weather. Irrespective of the on and the off states of the mode switch 73, the compensation level holder 75 supplies the adder 69 with a compensation signal representative of a compensation level, which is equal to the second level difference and to the minimum difference when the mode switch 73 is put in the on and the off states, respectively.

It is now understood that a combination of the mode switch 73 and the compensation level holder 75 serves as a switch circuit which is put selectively in one of a first and a second state and is responsive to the second difference signal for supplying the adder 69 with a compensation signal representative of a compensation level. When put in the first state, the switch circuit renders the compensation level equal to the second level difference. When put in the second state, the switch circuit renders the compensation level equal to a minimum difference which the second level difference has in the clear weather.

The adder 69 is for producing the gain control signal 62 by giving thereto a sum level which is equal to the estimated level difference plus the compensation level. The gain control signal 62 is similar to the gain control signal 39 when the modified system is put in the first mode of operation. In any event, the gain control signal 62 controls the variable gain and thereby the controllable transmission power in relation to the sum level so as to compensate for a rain attenuation which may be caused to the transmission signal Fui.

As will readily be understood from the description related to FIG. 3, the circuit combination 61 is equally well operable to control the variable gain in consideration of a ratio between the carrier-to-noise power ratios for the radiation and the return signals. In the rainy state, the celestial noise tends to further reduce the carrier-to-noise power ratio for the radiation signal.

The single transmission gain controller 57 may comprise, as indicated in a rectangle of dash-dot lines, the initial level or power ratio memory 65, the first subtractor 66, the auxiliary calculator 67, and the correlator 68. The estimated signal produced either for the power level of the radiation signal or for the carrier-to-noise power ratio thereof, is used as the gain control signal 59 in controlling the variable gain in relation to the estimated level or power ratio difference. The controllable transmission power is thereby controlled to make the satellite radiate down link signals in response to up link signals with the effective isotropically radiated power kept substantially constant at the satellite irrespective of the weather along the i-th up link for the i-th earth station 56i.

It may be mentioned here that a control loop including the satellite and the transmission power control system of the type thus far described with reference to any one of the figures of the accompanying drawings, may have a response time which is appreciably longer than about 0.3 second needed for return of an up link signal as a return signal. This is because the rain attenuation does not so quickly vary with time in general.

Reviewing the transmission power control systems illustrated with reference to FIGS. 1 through 8, the up and the down link paths are not much different from each other in the troposphere even when the satellite is not geostationary. The rain, as herein called, may be mist.

It may be that the particular earth station 11 is a monitor control station and does not transmit the transmission information signal TXSIG as an up link communication signal. Even in this case, it is possible to make the earth station transmit only an up link test signal in response to a particular pilot signal and receive a return signal together with the beacon signal.

When the satellite communication network is operable in compliance with the demand assign multiple access (DAMA) scheme, it is possible to make the i-th earth station 46i transmit towards the satellite a transmission signal resulting from, for example, the first channel transmission information signal TXIN1. The i-th earth station 46i should receive a return signal sent back through the channel assigned to that station 46i by frequency controlling the return signal receiver 53.

The eearth station 11, 46i, or 56i may be an earth station in a satellite communication network operable according to the frequency modulation multiplex communication technique. In this event, it is possible for the system described with reference to FIG. 2 or 5 to make the antenna 21 radiate an up link signal in response to a first signal derived from a predetermined one of the transmission information signals TXSIG or TXIN1 through TXINm. Alternatively, the first signal may be derived from a frequency modulation carrier. A return signal sent back to the earth station 11 or 46i is received by the antenna 21 with a return signal reception power, which expression is already used in conjunction with FIG. 2 for the return pilot signal because the return pilot signal is a return signal of a sort. It is possible to refer to the frequency modulation carrier also as an information signal.

It is to be noted in connection with the transmission power control systems thus far described that the circuitry for detecting the radiation signal reception power, such as the beacon signal reception power, or for detecting the relationship between the radiation signal reception power and the return signal reception power, is not restricted to the circuitry illustrated in conjunction with FIGS. 2, 5, and 7. The circuitry for controlling the variable gain is neither restricted to the illustrated examples. In this connection, it should be understood that the second signal may be the received beacon or radiation signal, that the third signal, if used, may be the received pilot or communication signal, and that the variable gain may be had by some other unit or units in the transmitting circuitry for producing the antenna feed signal.

Reviewing the transmission power control systems described with reference to FIGS. 4 through 8, it is understood that a satellite communication network may comprise a plurality of particular earth stations, such as 11. In this case, the i-th earth station 46i or 56i can use the radiation signal radiated from the satellite in response to an up link signal, such as Pu, sent from any one of the particular earth stations that is capable of exchanging communication with the i-th earth station 46i or 56i. The satellite communication network may comprise several specific earth stations of the type described in conjunction with FIGS. 4 and 5 and other specific earth stations of the type described in connection with FIGS. 6 and 7. Furthermore, some or all of the earth stations of the type of FIGS. 4 and 5 may be operable in a selected one of the above-described first and second modes of operation.

We claim:

1. A transmission power control system for use in at least one first earth station of a satellite network which includes at least one second earth station for sending a pilot signal to a satellite, said transmission power control system comprising first means responsive to a gain control signal for amplifying a test or transmission signal with a variable gain and sending to said satellite the test or transmission signal with a controllable transmission power dependent upon said variable gain, second means for receiving and detecting the pilot signal transmitted via said satellite to said first earth station, third means for receiving and detecting the test or transmission signal transmitted via said satellite to said first earth station, fourth means for comparing the outputs of said second and third means and for providing said gain control signal responsive thereto, thereby making said satellite radiate a signal with an effective isotropically radiated power kept substantially constant irrespective of a rain loss.

2. A transmission power control system for use in at least one first earth station of a satellite network which includes at least one second earth station for sending a pilot signal to a satellite, said transmission power control system comprising first means responsive to a gain control signal for amplifying a test or transmission signal with a variable gain and sending to said satellite the test or transmission signal with a controllable transmission power dependent on said variable gain, second means for receiving the pilot signal transmitted via said satellite to said first earth station ahnd for providing a first carrier-to-noise power ratio for the pilot signal, third means for receiving the test or transmission signal transmitted via said satellite to said first earth station and for providing a second carrier-to-noise ratio for the test or transmission signal, fourth means responsive to said first and second carrier-to-noise ratios for providing said gain control signal, thereby making said satellite radiate a signal with an effective isotropically radiated power kept substantially constant irrespective of rain loss.

* * * * *